(No Model.)
H. PETERSON.
ATTACHMENT FOR LAWN MOWERS.
No. 402,189. Patented Apr. 30, 1889.
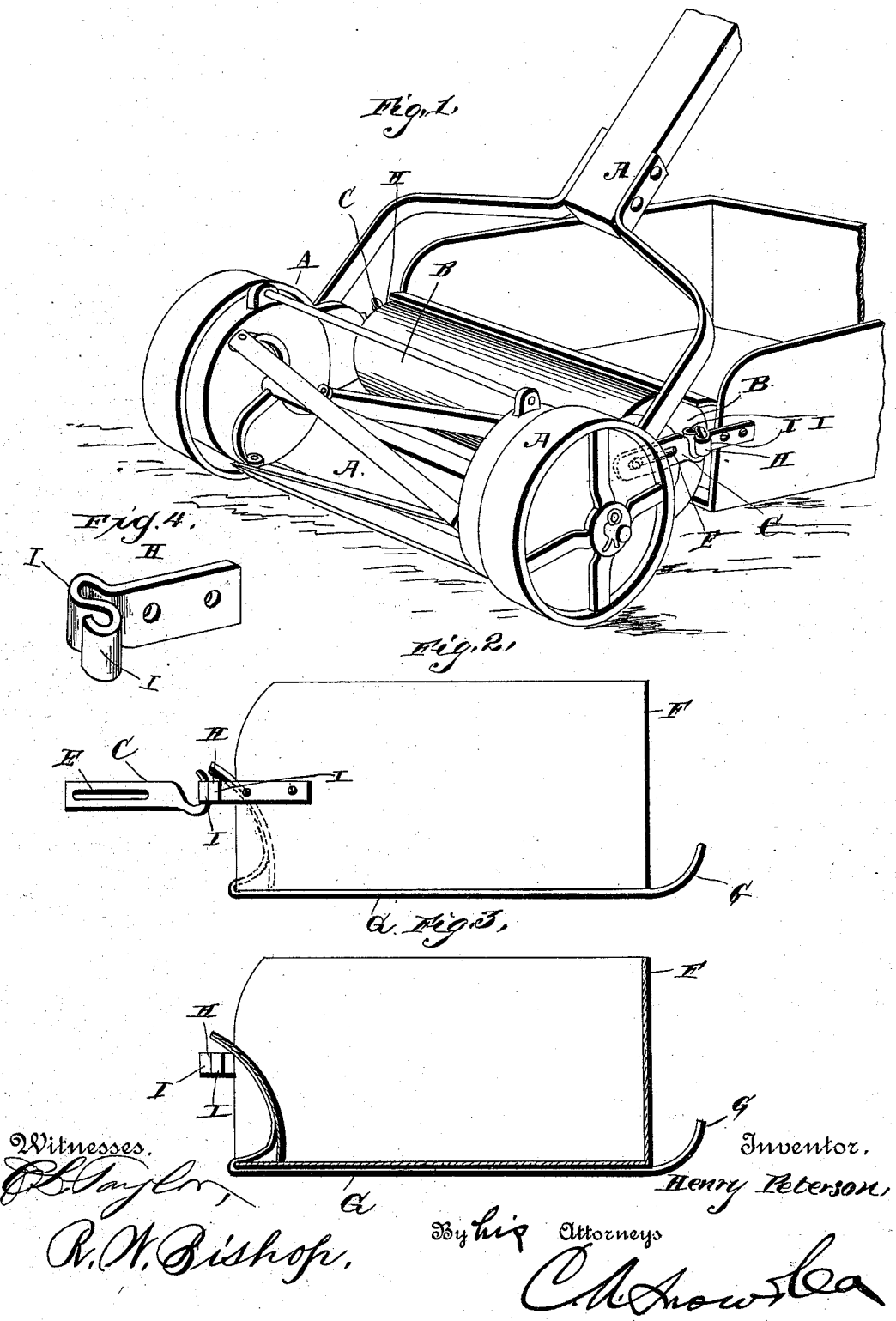
Witnesses.
P. L. Taylor,
R. W. Bishop.
Inventor,
Henry Peterson,
By his Attorneys

UNITED STATES PATENT OFFICE.

HENRY PETERSON, OF BERKELEY, ASSIGNOR OF TWO-THIRDS TO J. B. WILSON AND W. F. DELAINEY, OF OAKLAND, CALIFORNIA.

ATTACHMENT FOR LAWN-MOWERS.

SPECIFICATION forming part of Letters Patent No. 402,189, dated April 30, 1889.

Application filed October 18, 1888. Serial No. 288,481. (No model.)

*To all whom it may concern:*

Be it known that I, HENRY PETERSON, a citizen of the United States, residing at Berkeley, in the county of Alameda and State of California, have invented a new and useful Improvement in Attachments for Lawn-Mowers, of which the following is a specification.

My invention relates to an improvement in attachments for lawn-mowers; and it consists in a peculiar means of securing a grass-receptacle to the lawn-mower, as hereinafter described and claimed.

In the accompanying drawings, Figure 1 is a perspective view of a lawn-mower having my improved device attached thereto. Fig. 2 is a side view of the attachment. Fig. 3 is a vertical longitudinal section of the same, and Fig. 4 is a perspective view of one of the arms detached.

Referring to the drawings by letter, A designates a lawn-mower of the usual or any preferred construction, having the ground-roller B at its rear end, as shown. To the sides of the mower I bolt the rearwardly-extending hooks C, which are provided with longitudinal slots E, through which securing-bolts are passed into the sides of the mower. By means of these slots and bolts the hooks can be quickly adjusted to project more or less from the end of the mower, as will be readily understood.

F designates a receiving-pan or grass-tray, which may be of any desired dimensions, and is provided on its under side with the rearwardly-projecting runners G, having their ends turned up so as to pass readily over the ground, as will be readily understood. The front end of this receiving tray or pan is concave, as clearly shown in Fig. 3, so as to fit over the roller B of the lawn-mower. On its sides and the front end the pan is provided with the detachable arms H, having their front ends projected forward beyond the pan and provided with the eyes I, arranged at right angles to the length of the arms. These eyes I are engaged by the hooks C, secured to the sides of the mower to attach the device to the mower in operative position.

From the foregoing description it is thought the manner of using my device will be apparent. The pan is attached to the mower, as shown and described, so as to run along on the ground in rear of the same, and the grass, as it is cut by the mower, will be thrown by the roller over into the tray, and be collected thereby. When the tray is filled, it is detached and emptied and again attached to the mower and the cutting of the grass finished, so that the entire lawn can be cut or trimmed without leaving the cut grass thereon to be raked up. If so desired, the tray can be emptied without being detached by lifting the grass out by hand.

The device can be readily applied to different-sized mowers by detaching the arms H and turning them so that the loops I will project inward for a narrower mower, and turning them so that the loops I will project outward for a wider mower. The hooks C are also adjusted to project more or less from the rear end of the mower, according to the diameter of the ground-roller, as will be readily understood.

The device is very simple and efficient, and its advantages are thought to be obvious.

Having thus described my invention, what I claim, and desire to secure by Letters Patent, is—

The combination, with the lawn-mower, of the rearwardly-projecting longitudinally-adjustable hooks secured to the sides thereof, the tray or grass-receptacle having the runner on its under side, and a concave front end to fit over the ground-roller of the mower, and forwardly-projecting arms detachably secured to the sides of the tray and having each two eyes arranged as described and adapted to be engaged by the hooks secured to the mower, as specified.

In testimony that I claim the foregoing as my own I have hereto affixed my signature in presence of two witnesses.

HENRY PETERSON.

Witnesses:
 W. F. DELAINEY,
 A. B. MERRILL.